United States Patent [19]

Cusano et al.

[11] 4,146,492
[45] Mar. 27, 1979

[54] LUBRICANT COMPOSITIONS WHICH EXHIBIT LOW DEGREE OF HAZE AND METHODS OF PREPARING SAME

[75] Inventors: Carmen M. Cusano, Poughkeepsie; Ronald E. Jones, Glenham, both of N.Y.

[73] Assignee: Texaco Inc., New York, N.Y.

[21] Appl. No.: 673,248

[22] Filed: Apr. 2, 1976

[51] Int. Cl.² ............................................. C10M 1/24
[52] U.S. Cl. ................................................ 252/56 R
[58] Field of Search ..................................... 252/56 R

[56] References Cited

U.S. PATENT DOCUMENTS

| | | | |
|---|---|---|---|
| 2,020,714 | 11/1935 | Wulff et al. | 252/56 R X |
| 2,091,627 | 8/1937 | Bruson | 252/56 R X |
| 2,604,453 | 7/1952 | Popkin | 252/56 R |
| 3,522,180 | 7/1970 | Sweeney et al. | 252/59 |
| 3,691,078 | 9/1972 | Johnston et al. | 252/59 |
| 3,869,396 | 3/1975 | Van de Kraats et al. | 252/56 R |
| 3,897,353 | 7/1975 | Morduchowitz et al. | 252/56 R |
| 3,951,929 | 4/1976 | Sweeney | 252/56 R X |

FOREIGN PATENT DOCUMENTS

| | | | |
|---|---|---|---|
| 734918 | 5/1966 | Canada | 252/56 R |

Primary Examiner—Delbert E. Gantz
Assistant Examiner—Andrew Metz
Attorney, Agent, or Firm—Thomas H. Whaley; Carl G. Ries; Robert A. Kulason

[57] ABSTRACT

A pour depressant polyalkylacrylate comprising an interpolymer of (A) $C_1$–$C_{15}$ alkylacrylate and (B) $C_{16}$–$C_{22}$ alkylacrylate, said interpolymer having an average molecular weight of between about 1000 and 25,000, an A:B weight ratio of between about 90:10 and 50:50, an average alkyl side chain length between about 11 and 16 carbons, and prepared under neat conditions; a lubricating oil composition thereof comprising a major amount of lubricating oil and between about 0.005 and 10 wt.% of the interpolymeric pour depressant and between about 0.5 and 30 wt.% of a viscosity index improving ethylene-propylene copolymer of a molecular weight between about 10,000 and 150,000, a propylene content of 20 to 70 mole% and polydispersity index of less than 5; and a method of improving component compatibility, pour depression, and viscosity index comprising admixing a major amount of hydrocarbon lubricating oil with a minor amount of the interpolymeric polyalkylacrylate and ethylene-propylene copolymer.

18 Claims, No Drawings

LUBRICANT COMPOSITIONS WHICH EXHIBIT LOW DEGREE OF HAZE AND METHODS OF PREPARING SAME

BACKGROUND OF INVENTION

This invention relates to novel, relatively low molecular weight polyalkylacrylate prepared under neat conditions which is compatible in lubricating oil concentrates with ethylene-propylene viscosity index (VI) improvers and which exhibits in finished lubricating oil compositions improved pour depressing effects. In addition, the invention is directed to lubricating oil compositions wherein the polyalkylacrylate pour depressant and ethylene-propylene viscosity index (VI) improver are compatible and to a method of producing such compositions.

Hereinbefore and hereinafter the terms "polyalkylacrylate" and "alkylacrylate" are intended to encompass the alkyl ester derivatives of methacrylic acid as well as acrylic acid, i.e., polyalkylmethacrylate, polyalkylacrylate, alkylmethacrylate and alkylacrylate. Further, the term "neat" describes the undiluted product as well as the manufacture condition in which no liquid diluent is employed. Still further, the term "compatible" signifies the ability to form and maintain for long periods of time (i.e. months) a single homogenous phase. It has been found the degree of compatiblity of the polyacrylate and ethylene-propylene polymer in lubricating oil compositions is a direct function of the degree of haze in the initially formed composition, e.g., as measured by Lumetron Turbidity (LT). Compatibility is essentially premanent when initial Lumetron Turbidities are less than about 10.

In automotive lubricating oils two of the most common types of additives found therein are VI improvers and pour point depressors. In brief explanation of VI, it refers to the rate of change of viscosity of lubricating oil. Oils having a high VI exhibit a small change in viscosity with temperature variation than those with low VI. In lubricating applications such as engine lubrication where a wide range of temperatures is often encountered, lubricating oils having a high VI are desirable and often critically necessary. Long chain polymers and copolymers are in many instances effective VI improvers. Unfortunately, high molecular weight polymers are often susceptible to high shear rates in lubricating service which can cause a viscosity loss and other undesirable effects in the oil blend. One VI improver additive which has proven effective as a viscosity improver while exhibiting a high degree of shear stability is an amorphous copolymer of ethylene and propylene having an average molecular weight between about 10,000 and 150,000, preferably between about 30,000 and 80,000, a propylene content of between about 20 and 70 mole % and a $\overline{M}_w\overline{M}_n$ (polydispersity index) of less than about 5. This copolymer is described in U.S. Pat. Nos. 3,522,180 and 3,697,429.

The often used companion additive with the ethylene-propylene copolymer is the pour depressor polyalkylacrylate prepared from $C_1-C_{22}$ alkylacrylate monomer, mixtures thereof, and mixtures of $C_1-C_{22}$ alkylacrylate monomers and nitrogen containing compounds such as dialkylaminoalkyl methacrylates and n-acrylamides. The polyalkylacrylate polymers normally have a molecular weight between about 30,000 and 1,500,000 with the higher molecular weights normally favored on the basis of greater pour depressancy.

However, one of the continuing problems with the polyacrylate pour depressor-ethylene-propylene VI improver combinations is their incompatibility under concentrate conditions, that is, under conditions the pour depressor constitutes about 1 and 10 wt. % and between about 5 and 30 wt. % VI improver in at least 50 wt. % (major amount) lube oil base. As heretofore stated, this incompatibility takes the form of layered phase separation of the two additives which results in inappropriateness for blending into the finished composition since phase separation in large holding tanks will tend to cause the non uniform addition of additives in the finished formulation. Concentrate lube formulation as opposed to finished formulation is prepared in such form for savings in storage and transportation and are formed into the finished composition by blending the additional base oil.

One solution to the problem is set forth in U.S. Pat. No. 3,897,353 wherein the molecular weight of the polyalkylacrylate is controlled to between 30,000 and 120,000. The polyalkylacrylates of the patent were found to be compatible with ethylene-propylene copolymers in concentrate formulations for extended periods of less than three months. However, for longer periods, e.g., 3 to 6 months incompatibility was still evidenced.

In another prior art disclosure, U.S. Pat. No. 3,892,671 teaches lubricating oil compositions containing a compatible combination of nitrogen containing polyalkylacrylate of a molecular weight of from 2000 to 20,000, preferably 6000 to 10,000 prepared under diluent conditions and combination ethylene-propylene VI improver. Apparently in U.S. Pat. No. 3,892,671 a required factor for compatibility appears to be the use of nitrogen moiety in the polyacrylate.

Although the pour depressancy and VI effect appeared to be satisfactory in the foregoing patents, there is a continuing need to extend the term of compatibility of the polyalkylacrylate ethylene-propylene copolymer combinations, particularly in lube concentrates in addition to improving pour depressancy, VI, etc. properties. Further, from an economic standpoint, it is desirable to improve compatibility without having to resort to the more costly nitrogen containing polymethacrylates.

SUMMARY OF INVENTION

We have discovered and this constitutes our invention a novel interpolymer of (A) one or more $C_1-C_{15}$ alkylacrylates and (B) one or more of $C_{16}-C_{22}$ alkylacrylate having a weight ratio of A:B of between about 90:10 and 50:50, an average molecular weight of 1000 to 25,000 and an average alkyl carbon side chain length of between about 11 and 16 carbons produced under neat conditions having improved pour depressing effects and an improved compatibility with ethylene-propylene copolymer VI improvers in concentrate and finished lubricating oil formulations. We have further discovered lubricating oil compositions containing at least about 50 wt. % lubricating oil, between about 0.005 and 10 wt. % said interpolymer and between about 0.5 and 30 wt. % ethylene-propylene copolymer of a molecular weight between 10,000 and 150,000 having a propylene content of between 20 and 70 mole % and an $\overline{M}_w\overline{M}_n$ of less than 5 of superior pour depression and polyalkylacrylate-ethylene-propylene copolymer compatibility. We have still further discovered a method of forming said superior composition comprising preparing said polyalkylacrylate under neat conditions and introducing polyalkylacrylate together with the ethylene-propylene copolymer into a hydrocarbon lubricating oil under mixing conditions.

DETAILED DESCRIPTION OF THE INVENTION

As heretofore stated, the interpolymeric polyalkylacrylates are prepared from alkylacrylate monomers selected from (A) $C_1$-$C_{15}$ alkylmethacrylate group (B) $C_{16}$-$C_{22}$ alkylmethacrylate using A:B weight ratio of between about 90:10 and 50:50 with the monomer weight adjusted to give an average alkyl side chain carbon length of from 11 to 16 carbons and the degree of polymerization monitored to produce an interpolymer of a molecular weight of between 1000 and 25,000.

The polyalkylacrylate may be characterized by the following structure:

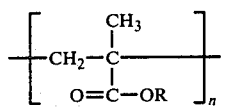

where n is an integer providing a molecular weight of 1000 to 25,000 R is the aforedescribed alkyl side chain and varies in the various repeating polymeric units in the above structural characterization and is derived from the alkyl portion of the alkylacrylate from which the interpolymer is prepared.

The polyalkylacrylate is prepared under neat conditions. This is an important factor in producing a polyalkylacrylate of superior pour depressancy as well as compatibility. It is theorized that when polyacrylates are prepared in the presence of lubricating oil diluent and/or organic solvents such as benzene or toluene, as is common practice, the resultant polymer forms a type of bond association with the diluent. When the thus bonded polyacrylate-diluent is incorporated in lubricating oils, the bonding forces have to be overcome, that is, broken before the pour depressant molecules can absorb or cocrystallize on the methylene faces of wax crystals in the oil. Such adsorbtion is required in order to promote the crystal growth in a direction which would reduce the tendency of wax crystals to form a high pour producing interlocking network. Under neat conditions of preparation, no such bond associations take place. The unexpectedness of the invention is emphasized by the fact that in prior teachings the high molecular weights and diluent preparation conditions are preferred.

In further respect to the method of preparation, the polyalkylacrylate contemplated herein is prepared by mixing the monomers in an inert atmosphere at a temperature of between about 65 and 110° C. in the presence of standard polymerization catalyst for acrylates (e.g. 0.05-2 wt. % of reaction mixture) such as azobisisobutronitrile, t-butyl peroxide, t-hydroperoxide and benzoyl peroxide, until a molecular weight of between about 1000 and 25,000 is reached. The degree of polymerization is monitored by periodically measuring the refractive index and/or kinematic viscosity of withdrawn samples. Reaction times of between about 4 and 6 hours are normally encountered.

Examples of the $C_1$-$C_{15}$ alkylmethacrylate monomer reactants contemplated herein are methylmethacrylate, n-butylmethacrylate, n-hexylmethacrylate, n-octylmethacrylate, n-decylmethacrylate, isodecylmethacrylate, n-dodecylmethacrylate, n-pentadecylmethacrylate and their alkylacrylate counterparts such as methylacrylate, etc. Examples of the $C_{16}$-$C_{22}$ alkylmethacrylate monomer reactants contemplated are n-hexadecylmethacrylate, n-octadecylmethacrylate, n-eicosylmethacrylate and n-docosylmethacrylate and their alkylacrylate counterparts such as n-hexadecylacrylate, etc. One preferred alkylmethacrylate is one derived from two n-alkylmethacrylate mixtures which in turn respectively are derived by standard esterification techniques through the reaction of methacrylic acid with two technical grade long chain primary alcohols. One of these alcohols is sold by Shell Oil Company under the tradename Neodol 25L and the other by Continental Oil Co. as Alfol 1620 SP. A typical analysis thereof is as follows:

| Description | Approx. Wt. % |
|---|---|
| Neodol 25L | |
| $C_{12}H_{25}OH$ | 24 |
| $C_{13}H_{27}OH$ | 24 |
| $C_{14}H_{29}OH$ | 24 |
| $C_{15}H_{31}OH$ | 15 |
| Other Alcohols | 13 |
| Alfol 1620 SP | |
| $C_{16}H_{33}OH$ | 55 |
| $C_{18}H_{37}OH$ | 27 |
| $C_{20}H_{41}OH$ | 9 |
| Other Alcohols | 9 |

Examples of the polyalkylmethacrylates contemplated herein are polyalkylmethacrylate of an average molecular weight of 2100 having an average alkyl side chain carbon length of 12 being a copolymer of n-decylmethacrylate and n-octadecylmethacrylate in a weight ratio of 78:28; a poly-n-alkylmethacrylate of an average molecular weight of 3500 having an average alkyl side chain carbon length of about 13 carbons being a copolymer of n-dodecylmethacrylate and n-eicosylmethacrylate in a weight ratio of 70:30 and poly-n-alkylmethacrylate of an average molecular weight of 4500, an average n-alkyl side chain carbon length of about 11 being a copolymer of n-butylmethacrylate and n-docosylmethacrylate in a weight ratio of 60:40. Further, they are the polyalkylacrylate counterparts.

In the lubricating oil compositions of the invention, the lubricating oil concentrates from which the finished lubricating oil compositions are formed suitable for automotive use contain between about 1.0 and 10 wt. % of polyalkylacrylates, between about 5 and 30 wt. % of the ethylene-propylene polymer, optionally employed are additional standard automotive additives and the remainder (at least 50 wt. %) lube oil. In the finished formulation suitable for automotive use, the polyalkylacrylate is present in an amount between 0.005 and 1 wt. %, preferably between 0.1 and 0.5 wt. %, between about 0.1 and 5 wt. % ethylene-propylene copolymer, preferably between about 0.5 and 3.0 wt. %, the remainder (at least about 85 wt. %) lubricating oil and optionally including standard supplementary additives.

Examples of standard supplementary additives antioxidants, e.g., the hydrocarbyl dithiophosphates such as zinc di (nonylphenoxyethyl) dithiophosphate, zinc di (dodecylphenoxyethyl) dithiophosphate and zinc di (nonylphenoxyethoxyethyldithiophosphate); additives which have both antioxidant corrosion inhibiting properties such as the aryl substituted amine compounds exemplified by phenylnaphthylamines and phenyl-alpha-naphthylamines, e.g., a mixture of 2,2-diethyl-4-octyldiphenylamine and 2,2-diethyl-4,4'-dioctyldiphenylamine. Still other supplementary additive examples are dispersants such as the overbased alkaline earth metal calcium alkaryl sulfonates such as calcium carbonate, overbased calcium alkaryl sulfonate wherein the alkaryl moieties are of a molecular weight of 500 to 1000 or ashless dispersants such as the alkenyl succinimides, e.g., a polyisobutylene (700–2000 m.w.) succinimide derived from tetraethylene pentamine.

The hydrocarbon base oil employed in the finished and concentrate formulations of the invention advantageously are mineral oils such as paraffinic, naphthenic lubricating oils and mixtures thereof having a viscosity of between about 70 and 5000 SUS at 100° F., preferably between about 75 and 300 SUS at 100° F., of a pour point of between about $-10°$ and $+50°$ F., preferably between $-5°$ and $+5°$ F. Concentrate and finished lubricating oil formulations are formulated by standard means such as introducing the additives into the base oil under mixing conditions at a temperature between about 50 and 130° C.

The amorphous ethylene-propylene copolymers which serve as the viscosity index (VI) improver additives in the lubricating composition of the invention are prepared as described in U.S. Pat. No. 3,522,180 wherein the copolymers are prepared in a hydrogen moderated reaction at moderate temperatures and pressures in the presence of a solvent soluble Zeigler-Natta catalyst. Gaseous mixtures of ethylene and propylene together with hydrogen are introduced into a reactor containing a solvent which does not deactivate the catalyst such as carbon tetrachloride, hexane, n-heptane, benzene or cyclohexane. Reaction temperatures between about $-40°$ and 250° F. in a pressure of 0 to 300 psig are satisfactory. The two component Zeigler-Natta catalyst comprises a first component of a hydrocarbyl vanadate, a hydrocarboxy vanadyl halide or a vanadyl trihalide. The second catalyst component is alkyl aluminum halide. Preferred catalyst systems include tri-n-butylorthovanadate as a first component and ethyl aluminum dichloride, diethyl aluminum chloride or ethyl aluminum sesquachloride as a second component. The Zeigler-Natta catalyst promoted hydrogen moderated polymerization is used to produce ethylene-propylene copolymers having an amorphous structure infrared analysis. An average molecular weight of between about 10,000–150,000 and a narrow molecular weight distribution measured by gel permentation chromatograph (GCP) of less than about 5. As heretofore stated, not only do these copolymers increase the viscosity index of lubricating oil when added thereto, but they exhibit a substantially high resistance to the high shearing forces experienced in lubricating surfaces which often mechanically degradate a long chain polymer.

The following examples further illustrate our invention but are not to be construed as limitations thereof.

EXAMPLE I

This example illustrates the preparation of the novel polyalkylacrylate contemplated herein under neat conditions.

The equipment employed consists of a one liter resin kettle equipped with external heaters, thermocouple, nitrogen inlet, stirrer, thermometer and condenser. In a typical reaction 450 grams of Neodol 25L ($\sim C_{12}-C_{15}$)alkylmethacrylate mixture having an average alkyl carbon chain length of 13.6 and 150 grams of Alfol 1620SP methacrylate ($\sim C_{16}-C_{20}$ n-alkylmethacrylate) of an average alkyl carbon chain length of 17.1 carbons and 6 grams of n-dodecylmercaptan were heated under a nitrogen blanket with stirring. When the pot temperature reached 95° C., 0.45 grams of azobisisobutronitrile (AIBN) polymerization initiator was added. Polymerization proceeded (95°–100° C.) as monitored by refractive index increase. After two hours of reaction, 0.2 grams of additional AIBN was added and heating at 95° C. was continued for an additional 1.5 hours. At the end of the 1.5 hour period, an additional 0.1 gram AIBN was added and heating continued for a further 2.5 hours giving a total reaction time of 6 hours. At the end of the 6 hour time the formed polyalkylmethacrylate gave the following analysis:

| Description | Value |
|---|---|
| Molecular Wt. (VP Osmometry) | 3300 |
| Kin. Vis. (2 wt. % polymer in 53 SUS 210° F. oil) 210° F., cs | 9.07 |
| Furol Vis. at 210° F., sec. | 440 |
| Alkyl Side Chain Carbon Length, aver. | 14.4 |
| Residual Monomer Content, wt. % | 0.3 |

EXAMPLE II

This example still further illustrates the preparation of the novel neat polyalkylacrylates contemplated herein.

The procedure of Example I was repeated in five separate runs with the exception that the methacrylate monomers were replaced as follows:

Run A — 50:50 weight ratio isodecylmethacrylate (IDMA):Alfol 1620SP methacrylate (AMA)

Run B — 10:40:50 weight ratio methylmethacrylate (MMA):IDMA:AMA

Run C — 10:40:50 weight ratio butylmethacrylate (BMA):IDMA:AMA

Run D — 21:59:20 weight ratio BMA:NMA:AMA

The neat polyalkyl methacrylates prepared in the above 4 runs were analyzed and the results are as follows:

| Description | Run A | Run B | Run C | Run D |
|---|---|---|---|---|
| Molecular Wt. (VP Osometry), | 3500 | 3500 | 3500 | 3500 |
| Kin. Vis. (2 wt. % in 53 SUS 210° F. oil) at 210° F., cs | 9.32 | 9.11 | 9.29 | 9.33 |
| Furol Vis. at 210° F., sec. | ~700 | ~450 | ~550 | ~700 |
| Aver. Alkyl Side Chain Carbon Length | 13.6 | 12.7 | 13.0 | 12.3 |
| Residual Monomer Content, wt. % | 0.7 | 0.1 | 0.1 | 0.3 |

EXAMPLE III

This example illustrates the preparation of a comparative polyalkylacrylate pour depressor:

The equipment employed was that used in Example I. In a typical reaction 150 grams of Neodol 25L methacrylate, 50 grams of Alfol 1620SP methacrylate, 100 grams of mineral oil of an SUS viscosity at 100° F. of approximately 145 and 0.2 grams of n-dodecylmercaptan were heated under mixing and nitrogen atmosphere conditions. When the reaction mixture reached 83° C., 0.3 gram of AIBN was added and the reaction was maintained at 83° C. for approximately 4 hours. Polymerization as in Example I was monitored by measuring refractive index incrementally. At the end of the 4 hour period an additional 0.15 gram AIBN was added and kept at 83° C. for 1.5 hours. Still another 0.15 gram AIBN was added at the end of the 1.5 hour period with the reaction maintained at 85° C. for an additional 1.5 hour. At the end of the second 1.5 hour period, 306 grams of 100 SUS (100° F.) mineral oil were additionally added and the mixture was heated at 100° C. for one hour to finish the preparation. Analysis of the lube oil solution product found it to contain 33.0 wt. % polyalkylmethacrylate of an average molecular weight of 180,000 having an average alkyl side chain carbon length of 14.4.

EXAMPLE IV

This example illustrates the effectiveness of the polyalkylacrylate of the invention in pour depressing lubricating oil compositions containing the ethylene-propylene copolymer and the pour depressing superiority in many instances of said polyalkylacrylates over conventional polyalkylmethacrylates.

To a mineral lubricating oil of an SUS viscosity of about 130 and 100° F. and a pour of 0° F. there was mixed an ethylene-propylene copolymer of an average molecular weigh of 100,000 having a propylene content of 32.8 mole %, and a representative polyalkylacrylate prepared in Example I to give a final composition containing 1.0 wt. % ethylene-propylene copolymer and 0.2 wt. % polyalkylmethacrylate, the remainder being the base oil. The resultant formulation was designated as Formulation 1. Comparative Formulation 2 was prepared using the same ingredients as Formulation 1 except that the comparative polyalkylmethacrylate of Example III was substituted for the polyalkylmethacrylate of representative Example I. The pour point data for the above test formulations and the base oil is set forth below:

| Formulation | Wt. % E-P Polymer | *Wt. % Polyalkyl-Methacrylate Polymer | Pour Point ° F. |
|---|---|---|---|
| Base Oil 3300 | 0 | 0 | 0 |
| Formulation 1 180,000 | 1.0 | 0.20 | −25 |
| Formulation 2 | 1.0 | 0.20 | +5 |

*Neat Basis

EXAMPLE V

This example illustrates the superior pour depressing effect of the representative polyalkylacrylates per se as opposed to comparative polyalkylacrylates.

To a mineral base oil having a pour of 50° F. and an SUS viscosity of 50 at 210° F. there was incorporated the representative polyalkylmethacrylate of Example I, the pour point in an amount of 0.26 wt. % and the resultant formulation was designated as Formulation 3. Formulation 4 was prepared utilizing the same ingredients except that comparative polyalkylmethacrylate of Example III was substituted for the polyalkylmethacrylate of Example I. Pour point of these two formulations and the base oil were measured and the results are set forth below:

| Description | Wt. % Polyalkyl-* Methacrylate | Approx. Average Pour Point, ° F. |
|---|---|---|
| Base Oil | 0 | +45 |
| Formulation 3 | 0.26 | +20 |
| Formulation 4 | 0.26 | 40 |

*Neat

EXAMPLE VI

This example still further illustrates the pour depressancy effect of the polyalkylacrylate in lubricant compositions of the invention.

To a paraffinic base oil having an SUS viscosity of ~130 at 100° F. and pour of 0° F. there was mixed an oil solution of 13 wt. % ethylene-propylene viscosity index improver of about 40,000 average molecular weight and 45 mole % propylene, 87 wt. % mineral oil (100 SUS at 100° F.) and the polyalkylmethacrylate of Example I. Additional test formulations were formed which were identical in all aspects to the aforedescribed formulation except containing varying amounts of the poly-n-alkyl-methacrylate of Example I. This series was designated as the Formulation E series. Another formulation series was also prepared for test which was identical to the Formulation E series with the exception that comparative polyalkylmethacrylate of Example III was substituted for representative polyalkylmethacrylate of Example I. This comparative series formulation was designated as the Formulation F series. The pour point test data is reported below in Table I:

TABLE I

| Description | *Wt. % E-P Copolymer | *Wt. % Poly-Methacrylate | Pour Point, ° F. |
|---|---|---|---|
| Base Oil | 0 | 0 | +5 |
| Formulation E-1 | 1.5 | 0.01 | −30 |
| Formulation E-2 | ↓ | 0.02 | −30 |
| Formulation E-3 | ↓ | 0.03 | −35 |
| Formulation E-4 | ↓ | 0.08 | −30 |
| Formulation E-5 | ↓ | 0.17 | −35 |
| Formulation F-1 | ↓ | 0.01 | −10 |
| Formulation F-2 | ↓ | 0.02 | −35 |
| Formulation F-3 | ↓ | 0.04 | −30 |
| Formulation F-4 | ↓ | 0.08 | −35 |
| Formulation F-5 | ↓ | 0.17 | −40 |

*Neat

EXAMPLE VII

This example illustrates the pour depressant equality and superiority, in general, of the neat polyalkylacrylate of the invention in respect to commercial polyalkylacrylates on an equal weight basis.

The base oil has an SUS viscosity at about 100° F. of about 148 and a pour point of about 0° F. and is designated as Base Oil Z.

Various fully formulated formulations are prepared representative of the compositions of the invention and comparative thereof. The representative formulations utilizing the neat polyalkylmethacrylate of Example I and the comparative formulations employing the comparative polyalkylacrylate oil solution of Example III. The ethylene-propylene copolymermer employed in all formulations was a 13 wt. % solution in diluent oil (100 SUS at 100° F.) of an average molecular weight of about 40,000 containing about 45 mole % propylene and a $\overline{M}_w\overline{M}_n$ of < 5. In addition to the polymethacrylate and ethylene-propylene copolymer supplementary additives normally found in fully formulated automotive lubricating oil formulations were included. The blends of the formulation and the test data are reported below in Table II:

TABLE II

| Blend Composition, Wt. %* | Control | AA | AA' | BB | BB' | CC | CC' | DD | DD' |
|---|---|---|---|---|---|---|---|---|---|
| Base Oil Z | 100 | 88.68 | 88.58 | 88.77 | 88.77 | 88.77 | 88.80 | 88.83 | 88.83 |
| Zinc Dialkylphenyldithiophosphate | — | ← | ← | ← | 1.35 | → | → | → | → |
| Overbased Ca Alkyl-(~450 m.w.) sulfonate (300 TBN) | — | ← | ← | ← | 1.92 | → | → | → | → |
| Polyisobutylene (~1200 m.w.) succinimide of tetraethylenepentamine | — | ← | ← | ← | 6.1 | → | → | → | → |
| Diethyloctyl-diethyldioctyl diphenylamine Mixture | — | ← | ← | ← | 0.25 | → | → | → | → |
| Ethylene-Propylene Coplym. | — | ← | ← | ← | 1.53 | → | → | → | → |
| Polyacrylate Ex. I | — | — | 0.17 | — | 0.08 | — | 0.03 | — | 0.017 |
| Polyacrylate Ex. III | — | 0.17 | — | 0.08 | — | 0.08 | — | 0.017 | — |
| Tests | | | | | | | | | |
| Kin. Vis., 100° F., cs | — | 93.4 | 91.0 | 93.3 | 90.5 | 92.3 | 90.9 | 91.8 | 90.5 |
| Kin. Vis., 210° F., cs | — | 12.49 | 13.08 | 13.25 | 12.98 | 13.24 | 13.00 | 12.91 | 12.99 |
| VI | — | 154 | 152 | 152 | 153 | 154 | 152 | 149 | 153 |
| Pour Pt., °F. | 0 | −30 | −40 | −35 | −35 | −30 | −25 | −10 | −20 |

*Neat

EXAMPLE VIII

This example illustrates the superiority of the polyacrylates of the invention in respect to compatibility with ethylene-propylene (EP) copolymer under concentrate conditions as measured by Lumetron Turbidity (L.T.). As heretofore stated, the lower the turbidity, the greater the term of compatibility.

Ten formulations were prepared. The polymethacrylates employed were prepared utilizing the reactants, reactant quantity ratios and general procedure of Example I except polymerization initiator quantities, temperatures and end stopper were varied to vary the molecular weight. The ethylene-propylene copolymers were in the form of filtered and unfiltered lubricating oil of the polymer.

The neat polymethacrylate and ethylene-propylene polymer lube oil solutions were blended and the turbidity of the resultant blends were measured. The test data and results are reported below in Table III:

TABLE III

| Run No.[1] | Polymethacrylate Molecular Wt. | EP Copolymer | L. T. |
|---|---|---|---|
| 1 | 3160 | A | 12.0 |
| 2 | 79,100 | A | 17.5 |
| 3 | 3160 | B | 4.5 |
| 4 | 128,000 | B | 13.0 |
| 5 | 78,100 | B | 13.5 |
| 6 | 71,100 | B | 13.0 |
| 7 | 3160 | C | 12.5 |
| 8 | 128,000 | C | 20.0 |
| 9 | 78,100 | C | 17.0 |
| 10 | 71,100 | C | 17.0 |

A. Unfiltered 13 wt. % ethylene-propylene copolymer lube oil solution having L. T. of 14.0 EP copolymer has an ethylene content of 55 mole % and a molecular weight of about 40,000.

B. Filtered 13 wt. % ethylene-propylene copolymer lube oil solution having L. T. of 5.0. EP copolymer has an ethylene content of 55 mole % and a molecular weight of about 40,000.

C. Unfiltered 13 wt. % ethylene-propylene copolymer lube oil solution having L. T. of 13.5. EP copolymer has an ethylene content of 67.2 mole % and a molecular weight of about 40,000.

[1] All blends contained 3.0 wt. % polymethacrylate, 12.6 wt. % ethylene-propylene copolymer and 8.4 wt. % lubricating oil (~100 SUS at 100° F.).

In the above table, Runs 1, 3 and 7 represent the representative concentrate compositions of the invention, the remainder are comparative. As can be seen from the above, the polymethacrylates of the invention reduce the turbidity of the resultant ethylene-propylene-polymethacrylate-lube oil blend, i.e. whereas the comparative polymethacrylates increase turbidity.

We claim:

1. A lubricating oil composition comprising a major amount of lubricating oil of an SUS viscosity at 100° F. of between about 70 and 5000, between about 0.5 and 30 wt. % of an ethylene-propylene copolymer of a molecular weight between about 10,000 and 150,000 a propylene content of between 20 and 70 wt. % and a polydispersity index of less than about 5, and between about 0.005 to 10 wt. % of a neat interpolymeric polyalkylacrylate of (A) $C_1$–$C_{15}$ alkylacrylate and (B) $C_{16}$–$C_{22}$ alkylacrylate having a weight ratio of A:B of between about 90:10 and 50:50, a molecular weight of from 1000 to 25,000 and an average alkyl side chain length of between about 11 and 16 carbons.

2. A lubricating oil composition comprising a major amount of lubricating oil of an SUS viscosity at 100° F. of between about 75 and 300, between about 0.5 and 30 wt.% of an ethylene-propylene copolymer of a molecular weight between about 10,000 and 150,000, a propylene content of between 20 and 70 wt. % and a polydispersity index of less than about 5, and between about 0.005 to 10 wt. % of a neat interpolymeric polyalkylmethacrylate of (A) $C_1$–$C_{15}$ alkylmethacrylate and (B) $C_{16}$–$C_{22}$ alkylmethacrylate having a weight ratio of A:B of between about 90:10 and 50:50, a molecular weight of from 1000 to 25,000 and an average alkyl side chain length of between about 11 and 16 carbons.

3. A lubricating oil composition in accordance with claim 2 wherein said copolymer is present in an amount of between 5 and 30 wt. % and said polymethacrylate is present in an amount of between about 1 and 10 wt. %.

4. A lubricating oil composition in accordance with claim 2 wherein said copolymer is present in an amount of between about 0.50 and 5.0 wt. % and said polymethacrylate is present in an amount of between about 0.005 and 1 wt. %.

5. A lubricating oil composition in accordance with claim 2 wherein said (A) is composed of dodecylmethacrylate, tridecylmethacrylate, tetradecylmethacrylate and said (B) is composed of hexadecylmethacrylate, octadecylmethacrylate and eicosylmethacrylate, said weight ratio is 3:1, and side average molecular weight is 3300, and said average alkyl said chain length is about 14.4 carbons.

6. A lubricating oil composition in accordance with claim 2 wherein said (A) is isodecylmethacrylate and said (B) is a mixture of hexadecyl-, octadecyl- and eicosylmethacrylates, said weight ratio is 50:50 and said average alkyl chain length is about 13.6 carbons and said average molecular weight is about 3500.

7. A lubricating oil composition in accordance with claim 2 wherein said (A) is a mixture of methylmethacrylate and isodecylmethacrylate, said (B) is a mixture of hexadecyl-, octadecyl- and eicosylmethacrylates, said weight ratio is 50:50 and said average alkyl side chain length is about 12.7 carbons and said average molecular weight is about 3500.

8. A lubricating oil composition in accordance with claim 2 wherein said (A) is a mixture of butylmethacrylate and isodecylmethacrylate; said (B) is a mixture of hexadecyl-, octadecyl- and eicosylmethacrylates, said weight ratio is 50:50 and said average alkyl side chain length is about 13.0 carbons and said average molecular weight is about 3500.

9. A lubricating oil composition in accordance with claim 2 wherein said (A) is a mixture of butyl-, dodecyl-, tridecyl-, tetradecylmethacrylates; said (B) is a mixture of heptadecyl-, octadecyl- and eicosylmethacrylates, said weight ratio is 80:20, said average alkyl side chain length is 12.3 carbons and said average molecular weight is 3500.

10. A method of producing a single phase lubricating oil of improved pour and viscosity index comprising a major amount of hydrocarbon lubricating oil of an SUS viscosity at 100° F. of between about 70 and 5000, between about 1 and 10 wt. % polyalkylacrylate pour depressant, a neat interpolymeric polyalkylacrylate of (A) $C_1$–$C_{15}$ alkylacrylate and (B) $C_{16}$–$C_{22}$ alkylacrylate having a weight ratio of A:B of between about 90:10 and 50:50, a molecular weight of from 1000 to 25,000 and an average alkyl side chain length of between about 11 and 16 carbons and an ethylene-propylene viscosity index improving copolymer of a molecular weight of between 10,000 and 150,000 a propylene content of between 20 and 70 wt. % and a polydispersity index of less than about 5, comprising admixing the hydrocarbon lubricating oil with said polymeric pour depressant formed under neat conditions and said VI improver.

11. A method of producing a single phase lubricating oil of improved pour and viscosity index comprising a major amount of hydrocarbon lubricating oil of an SUS viscosity at 100° F. of between about 75 and 300, between about 1 and 10 wt. % polyalkymethacrylate pour depressant, a neat interpolymeric polyalkylmethacrylate of (A) $C_1$–$C_{15}$ alkylmethacrylate and (B) $C_{16}$–$C_{22}$ alkylmethacrylate having a weight ratio of A:B of between about 90:10 and 50:50, a molecular weight of from 1000 to 25,000 and an average alkyl side chain length of between about 11 and 16 carbons and an ethylene-propylene viscosity index improving copolymer of a molecular weight of between 10,000 and 150,000, a propylene content of between 20 and 70 wt. % and a polydispersity index of less than about 5, comprising admixing the hydrocarbon lubricating oil with said polymeric pour depressant formed under neat conditions and said VI improver.

12. A method in accordance with claim 11 wherein said copolymer is present in an amount of between about 5 and 30 wt. % and said polymethacrylate is present in an amount of between about 1 and 10 wt. %.

13. A method in accordance with claim 11 wherein said copolymer is present in an amount of between about 0.10 and 5 wt. % and said polymethacrylate is present in an amount of between about 0.005 and 1.0 wt. %.

14. A method in accordance with claim 11 wherein said (A) is composed of dodecylmethacrylate, tridecylmethacrylate, tetradecylmethacrylate, and said (B) is composed of hexadecylmethacrylate, octadecylmethacrylate and eicosylmethacrylate, said weight ratio is 3:1, said average molecular weight is 3300, and said average alkyl side chain length is about 14.4 carbons.

15. A method in accordance with claim 11 wherein said (A) is isodecylmethacrylate and said (B) is a mixture of hexadecyl-, octadecyl- and eicosylmethacrylates, said weight ratio is 50:50, said average alkyl chain length is about 13.6 carbons and said average molecular weight is about 3500.

16. A method in accordance with claim 11 wherein said (A) is a mixture of methylmethacrylate and isodecylmethacrylate, said (B) is a mixture of hexadecyl-, octadecyl- and eicosylmethacrylates, said weight ratio is 50:50, said average alkyl side chain length is about 13.7 carbons and said average molecular weight is about 3500.

17. A method in accordance with claim 11 wherein said (A) is a mixture of butylmethacrylate and isodecylmethacrylate; said (B) is a mixture of hexadecyl-, octadecyl, and eicosylmethacrylates, said weight ratio is 50:50 and said average molecular weight is about 3500.

18. A method in accordance with claim 11 wherein said (A) is a mixture of butyl-, dodecyl-, tridecyl-, tetradecylmethacrylates; said (B) is a mixture of heptadecyl-, octadecyl-, and eicosylmethacrylates, said weight ratio is 80:20, said average alkyl side chain length is 12.3 carbons and said average molecular weight is 3500.

* * * * *